(12) United States Patent
Elbaz et al.

(10) Patent No.: US 7,658,418 B1
(45) Date of Patent: Feb. 9, 2010

(54) SWIVEL CONNECTOR FOR NONMETALLIC ELECTRICAL CONDUIT

(75) Inventors: Shimon Elbaz, Rockaway Park, NY (US); Gil Elbaz, Belle Harbor, NY (US)

(73) Assignee: Superflex Ltd., Brooklyn, NY (US)

( * ) Notice: Subject to any disclaimer, the term of this patent is extended or adjusted under 35 U.S.C. 154(b) by 285 days.

(21) Appl. No.: 11/747,473

(22) Filed: May 11, 2007

(51) Int. Cl.
    *F16L 11/118* (2006.01)
(52) U.S. Cl. .............. 285/153.1; 285/154.1; 285/181; 285/354; 285/387; 174/60
(58) Field of Classification Search .............. 285/354, 285/364, 153.1, 153.2, 154.1, 154.4, 181, 285/184, 272, 387, 388; 174/15.5, 15.6, 174/21 R, 34, 60, 64, 653, 655, 656, 657; 439/320, 323
See application file for complete search history.

(56) References Cited

U.S. PATENT DOCUMENTS

| 954,504 | A | | 4/1910 | Drew |
| 5,064,226 | A | | 11/1991 | Klas |
| 5,951,066 | A | * | 9/1999 | Lane et al. ................. 285/364 |
| 6,114,631 | A | * | 9/2000 | Gretz ........................ 174/651 |
| 6,555,749 | B1 | * | 4/2003 | Pyron ........................ 174/655 |
| 7,048,561 | B1 | | 5/2006 | Elbaz |

* cited by examiner

*Primary Examiner*—James M Hewitt
*Assistant Examiner*—Gwendolyn D Fournet
(74) *Attorney, Agent, or Firm*—Seth Natter; Natter & Natter

(57) ABSTRACT

A swivel coupling for electrical conduit is formed of a pair of arcuate tubular sections joined together at a pair of connecting flanges. A liquid tight seal is provided by an O-ring which seats in registered annular grooves in the face of each flange. A coupling nut tightens the flanges against one another. Formed at the end of one of the sections is a junction box fitting including a threaded nipple which is inserted through an opening of the junction box until a stop nut, positioned on the nipple, engages the box. A tightening nut is engaged over the nipple from the interior of the junction box to secure the swivel coupling to the box. The end of the other tubular section includes a conduit fitting for securing a length of electrical conduit. Because the stop nut is installed after the coupling nut has been advanced past the nipple, a reduced diameter coupling nut may be employed.

17 Claims, 3 Drawing Sheets

SWIVEL CONNECTOR FOR NONMETALLIC ELECTRICAL CONDUIT

BACKGROUND OF THE INVENTION

1. Field of the Invention

This invention relates generally to electrical wiring installations and more particularly to a liquid tight swivel connector for coupling flexible nonmetallic electrical conduit to a junction box.

2. Antecedents of the Invention

Among the requirements for electrical wiring were safety and ease of installation. With respect to electrical conduit installations, it was important to assure that fittings, which were coupled to lengths of conduit, were not prone to obstructions to the threading of wires or cables therethrough.

Additionally, space limitations presented in a particular installation environment often required angular fittings of constricted dimensions and fittings which needed to be angularly adjustable on site.

U.S. Pat. No. 6,114,631 disclosed a swivel fitting which was apparently injection molded of thermoplastic and comprised a pair of tubular members, each of which included a bore. The tubular member had mating flanges, one of which included radiused corners and the other, a mating radiused recess. The flanges, hence, the tubular members, were joined together by a coupling nut. The free end of one of the tubular members included a junction box nipple and an integral radial abutment flange for bearing against the outside of a junction box, while the free end of the other member included a conduit fitting.

In order to obtain appropriate clearance for assembly of the swivel fitting, the coupling nut was required to pass over the radial abutment flange and was thus required to have a relatively large diameter, which resulted in placing limitations on the radius of curvature of the fitting and precluded usage of the fitting in certain limited space applications.

A further drawback inherent in the swivel fitting of U.S. Pat. No. 6,114,631 was that the internal bores of each member were not coincident at the radiused flanges, which presented internal obstructions to the smooth threading of wires and cables.

SUMMARY OF THE INVENTION

A swivel coupling for nonmetallic electrical conduit includes a pair of arcuate tubular sections. Each tubular section includes a connecting flange having a substantially planar face. The faces of the connecting flanges lie parallel to a sloped reference plane. A coupling nut having a minimum internal diameter secures the connecting flanges together, with the sections being rotatable relative to one another when the coupling nut has not been tightened and being fixed relative to one another when the coupling nut is tightened. An end of the one section opposite the connecting flange includes a nipple having a threaded portion and an end of the other section opposite the flange includes a conduit fitting. A stop nut having a diameter greater than the minimum internal diameter of the coupling nut is positioned on the threaded portion of the nipple so that the swivel coupling may be assembled by passing the coupling nut over the nipple to engage the connecting flanges prior to positioning the stop nut on the threaded portion of the nipple.

From the foregoing compendium, it will be appreciated that it is an aspect of the present invention to provide a swivel coupling for nonmetallic electrical conduit of the general character described which is easy to install.

A feature of the present invention is to provide a swivel coupling for nonmetallic electrical conduit of the general character described which is safe to use and in full compliance with electrical codes and regulations.

A consideration of the present invention is to provide a swivel coupling for nonmetallic electrical conduit of the general character described which is easy to assemble.

A further aspect of the present invention is to provide a swivel coupling for nonmetallic electrical conduit of the general character described which is free of internal obstructions and thus facilitates easy threading of cables and conduits.

Another feature of the present invention is to provide a swivel coupling for nonmetallic electrical conduit of the general character described which is well suited for economical mass production fabrication.

Yet a further aspect of the present invention is to provide a swivel coupling for nonmetallic electrical conduit of the general character described which is well suited for fabrication of thermoplastic material by injection molding.

Yet another feature of the present invention is to provide a swivel coupling for nonmetallic electrical conduit of the general character described which serves to reduce overall labor costs associated with electrical installations.

Another consideration of the present invention is to provide a swivel coupling for nonmetallic electrical conduit of the general character described which is low in cost.

A still further feature of the present invention is to provide a swivel coupling for nonmetallic electrical conduit of the general character described which is well suited for use in tight fitting environments.

Other aspects, features and considerations in part will be obvious and in part will be pointed out hereinafter.

With these ends in view, the invention finds embodiment in the various combinations of elements, arrangements of parts and series of steps by which the aforesaid aspects, features and considerations and certain other aspects, features and considerations are attained, or with reference to the accompanying drawings and the scope of which will be more particularly pointed out and indicated in the appended claims.

BRIEF DESCRIPTION OF THE DRAWINGS

In the accompany drawings in which are shown one of the various possible exemplary embodiments of the invention.

DESCRIPTION OF THE PREFERRED EMBODIMENT

Figure 1:
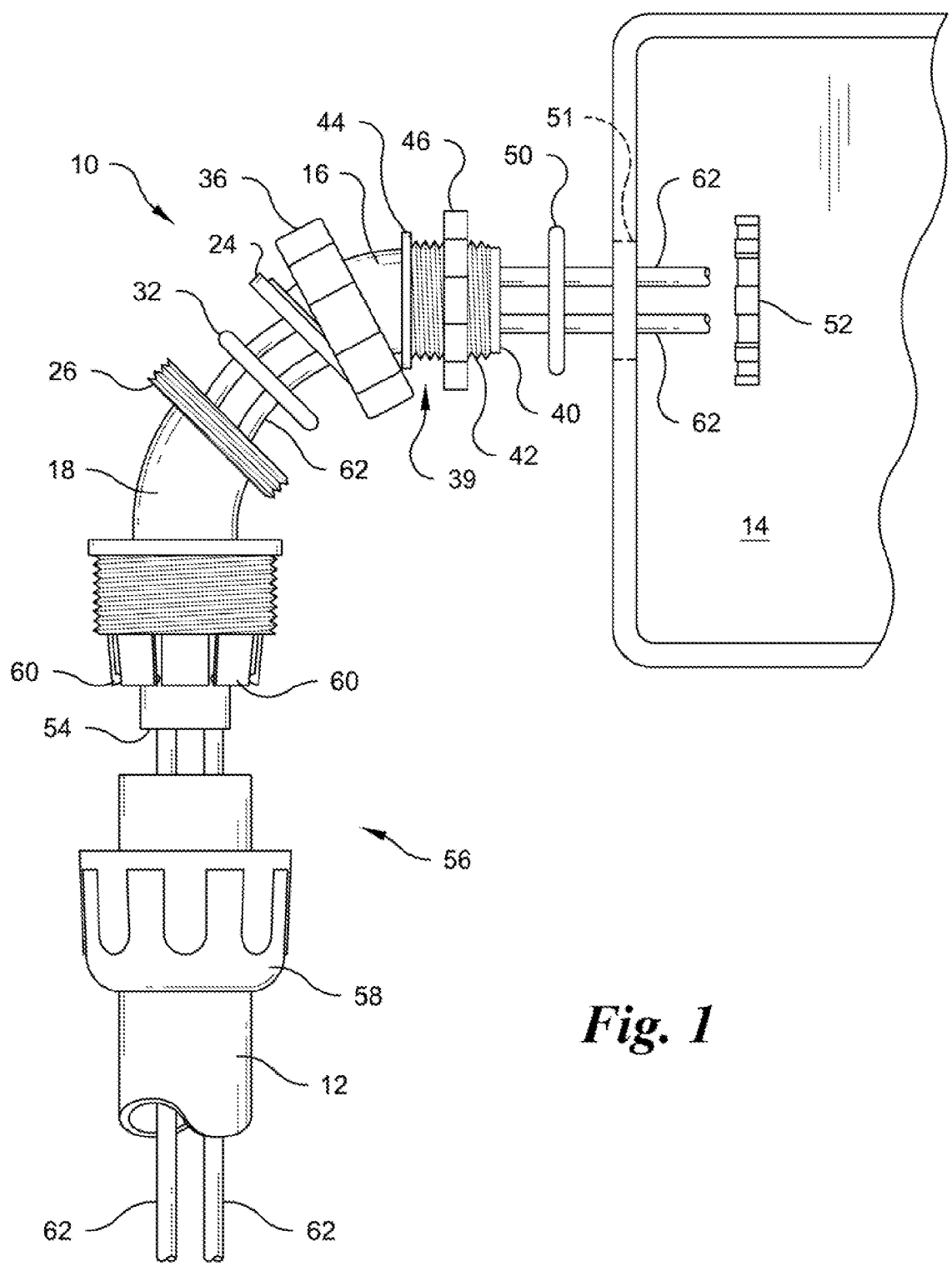
FIG. 1 is a fragmentary exploded view of a portion of an electrical installation, with components broken away for clarity, and illustrating a swivel connector constructed in accordance with and embodying the invention in a right angle orientation and interconnecting a portion of nonmetallic electrical conduit to a junction box.

Referring now in detail to the drawings, the reference numeral 10 denotes generally a swivel connector constructed in accordance with and embodying the invention. The swivel connector 10 is configured to interconnect a section of nonmetallic electrical conduit 12, such as Type B conduit, to an electrical junction box 14. The swivel connector 10 is preferably formed of a pair of arcuate tubular sections 16, 18, each of which may be injection molded in one piece from a suitable thermoplastic. A bore, 20, 22 extends through the sections 16, 18 respectively.

In accordance with the invention, the sections 16, 18 are joined together at a joint formed of a pair of connecting flanges, 24, 26, respectively. Each connecting flange includes a generally planar face which lies parallel to a common reference plane 28. The plane 28 is perpendicular to a central axis 30 which extends through the bores 20, 22 at the intersection of the plane 28 and the central axis 30. It should be noted that the plane 28 lies at an angle of approximately 45° with respect to those portions of the central axis 30 which extend through the ends of the sections 16, 18 opposite the flanges 24, 26.

The face of each connecting flange 24, 26 is generally planar, however, in accordance with the invention, an annular groove of semicircular transverse configuration 25 extends into the face of the connecting flange 24, and a mating annular groove of semicircular transverse configuration 27 extends into the face of the flange 26. The grooves 25, 27 are centered about the axis 30 at the plane 28. Within the annular grooves 25, 27, an "O" ring 32 is positioned to provide an effective liquid tight seal when the flanges 24, 26 are drawn together.

To draw the connecting flanges 24, 26 together, the flange 26 includes external threads 34 which are engaged by internal threads of a threaded coupling nut 36. The coupling nut 36 includes a constricted throat 37 formed by a flange 38 having an internal diameter less than the diameter of the connecting flange 24, so that when the nut 36 is tightened, the flanges 24, 26 are drawn together and the "O" ring 32 is compressed.

Figure 2:
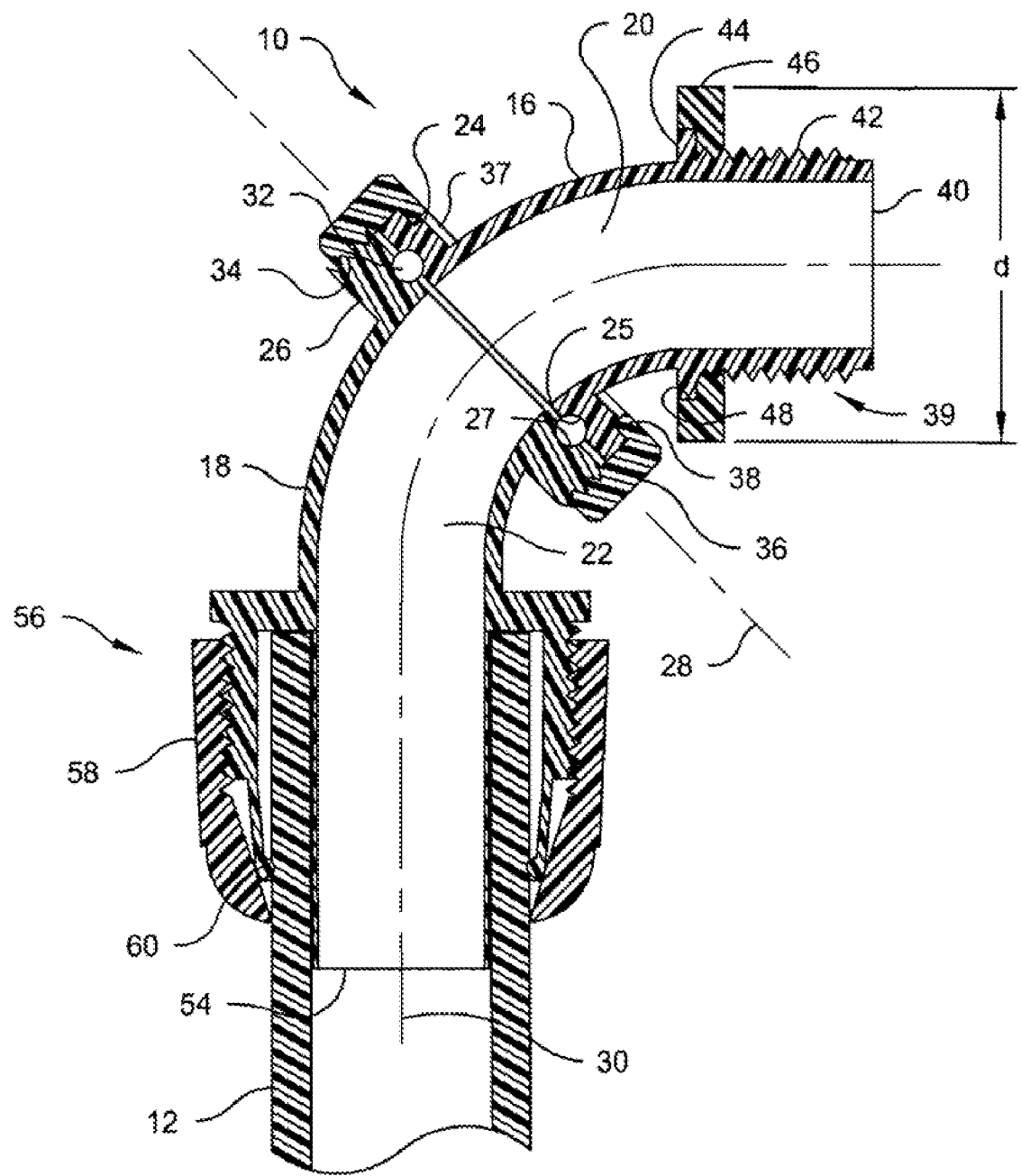
FIG. 2 is an enlarged scale longitudinal sectional view through the swivel connector and conduit section, with portions deleted for clarity and illustrating a pair of arcuate tubular sections joined by a coupling nut at planar abutting flanges and with an O-ring seated in registered grooves in the face of each flange.
Figure 3:
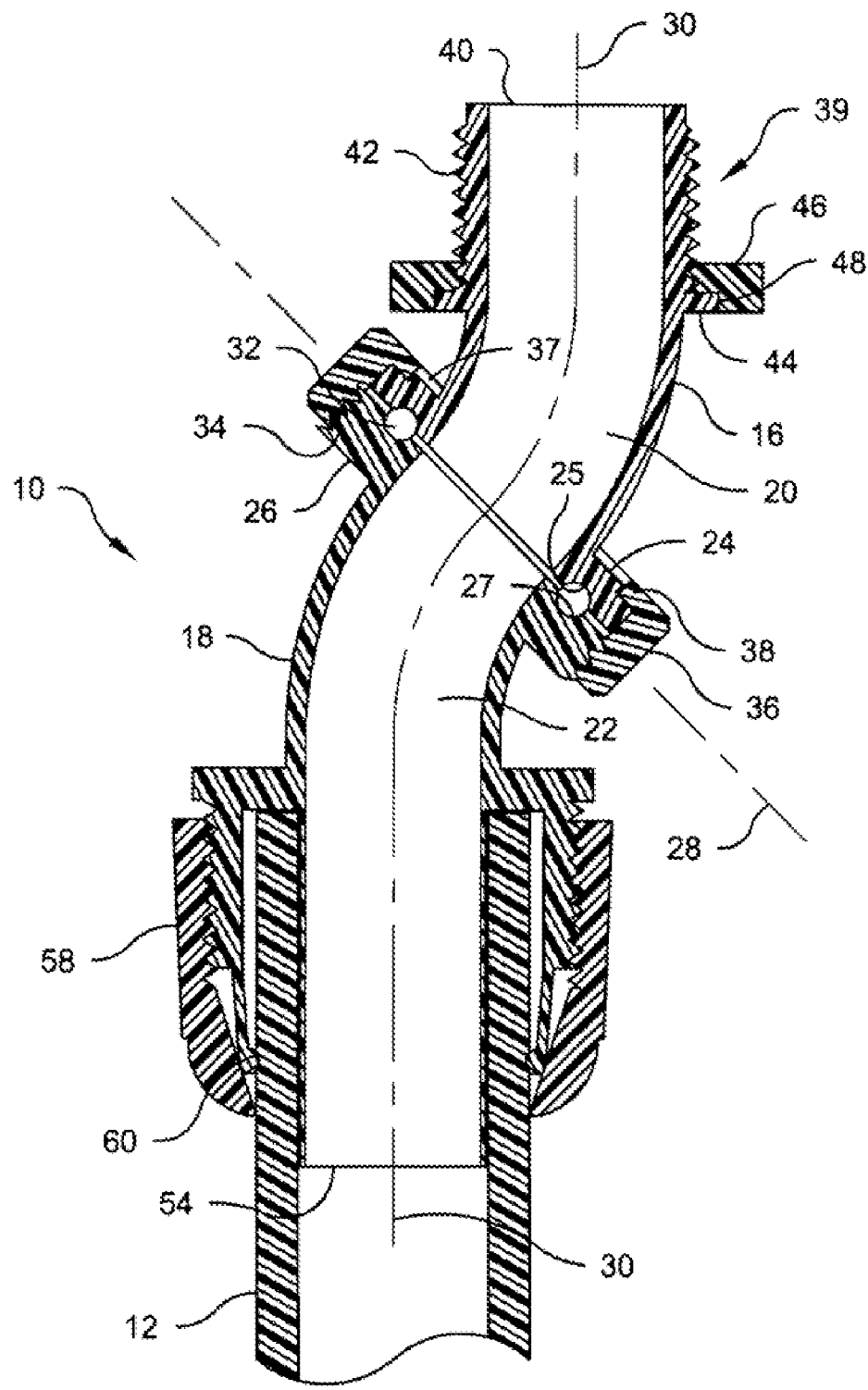
FIG. 3 is a longitudinal sectional view, similar to FIG. 2, but illustrating the coupling in a different angular orientation, wherein the axis of the conduit is parallel to and offset from the access opening of the junction box.

Prior to tightening the coupling nut 36, the sections 16, 18 are rotated relative to one another within a range of 360° about the axis 30 at the plane 28 to a desired angular orientation at or anywhere between the positions illustrated in FIG. 2 and FIG. 3, including the mirror images thereof, so as to obtain a proper fit in an electrical installation.

An end 40 of the section 16 opposite the flange 24 includes a nipple 39 having a threaded portion 42 suitable for fixing the swivel connector 10 to the junction box 14 through a knockout opening 51, for example.

The inner end of the threaded portion 42 terminates at a stop flange 44 having a diameter only slightly greater than that of the threaded portion 42. The diameter of the stop flange 44 is less than the diameter of the throat 37 of the flange 38, so that the coupling nut 36 can be passed over the nipple 39 to engage the threads 34 of the connecting flange 26 when the swivel connector 10 is assembled, either on site, preassembled at the manufacturing facility or assembled prior to arriving at the job site.

In order to secure the swivel connector 10 to the junction box 14, a stop nut 46 having a maximum transverse dimension "d" larger than the diameter of the stop flange 44 and also larger than the diameter of the junction box knockout opening 51, is then engaged over the threaded portion 42. The stop nut 46 may include a channel groove 48 within which the stop flange 44 seats. Because the stop flange diameter is considerably less than the maximum transverse dimension of the stop nut 46, the diameter of the coupling nut 36 as well as the flanges 24, 26 may be minimized to avoid bulk in the assembled swivel connector 10.

Alternately, the stop flange may be eliminated, with the stop nut locking in position when the inner end of the threaded portion of the nipple is reached.

An "O" ring or washer 50 may then be applied over the threaded portion 42, after which the threaded portion 42 is inserted through the knockout opening 51 of the junction box 14 and a tightening nut 52 is engaged over the nipple and tightened, as illustrated in FIG. 1.

An end 54 of the arcuate section 18 opposite the flange 26 includes a conventional conduit fitting 56 for securing the conduit 12 to the swivel connector 10. The fitting 56 may comprise, by way of example only, a collet type clamp having a tightening collar 58 and integral grip fingers 60. Other connector fittings may also be employed, such as that disclosed in U.S. Pat. No. 7,048,561, which is incorporated herein by reference.

Electrical cables or wires 62 may then be fed through the conduit 12 and the swivel connector 10 and into the junction box 14 before or after fitting the swivel connector 10 to the junction box 14 or before or after fitting the conduit 12 to the swivel connector 10.

Thus it will be seen that there is provided a swivel connector for nonmetallic electrical conduit which achieves the various aspects, features and considerations of the present invention and which is well suited to meet the conditions of practical usage.

As various possible further embodiments might be made of the present invention and as various changes might be made in the illustrative embodiment set forth herein without departing from the spirit of the invention, it is to be understood that all matter herein described or shown in the accompanying drawings is to be interpreted as illustrative and not in a limiting sense.

Having thus described the invention, there is claimed as new and desired to be secured by Letters Patent:

1. A swivel coupling for nonmetallic electrical conduit, the coupling comprising a first tubular section and a second tubular section, each tubular section having a connecting flange at one end, each connecting flange having a substantially planar face, the faces of the connecting flanges extending parallel to a common reference plane, a coupling nut having a minimum internal diameter securing the connecting flanges together, the tubular sections being rotatable relative to one another when the coupling nut has not been tightened and being fixed relative to one another when the coupling nut is tightened, an end of the first section opposite the connecting flange including a nipple having a threaded portion and an end of the second section opposite the flange including a conduit fitting, the first section including a stop flange at an inner end of the threaded portion, a stop nut positioned on the threaded portion in abutment against the stop flange, a groove formed in the stop nut, and the stop flange being seated in the groove, the stop flange having a diameter less than the minimum internal diameter of the coupling nut, the stop nut having a maximum transverse dimension greater than the minimum internal diameter of the coupling nut, whereby the swivel coupling may be assembled by passing the coupling nut over the nipple and over the stop flange to engage the connecting flanges prior to positioning the stop nut on the threaded portion of the nipple.

2. A swivel coupling for nonmetallic electrical conduit as constructed in accordance with claim 1 wherein at least one of the tubular sections is arcuate.

3. A swivel coupling for nonmetallic electrical conduit as constructed in accordance with claim 1 further including an annular groove of semicircular transverse configuration formed in the planar face of each connecting flange and an "O" ring seated in the grooves, whereby a watertight seal is effected.

4. A swivel coupling for nonmetallic electrical conduit as constructed in accordance with claim 1 wherein the coupling nut includes an internally threaded portion and a constricted throat, the minimum internal diameter being defined by the constricted throat.

5. A swivel coupling for nonmetallic electrical conduit as constructed in accordance with claim 1, the tubular sections having a bore with a central axis, the common reference plane intersecting the central axis and the tubular sections being rotatable relative to one another about the central axis.

6. A swivel coupling for nonmetallic electrical conduit as constructed in accordance with claim 5 wherein the common reference plane lies at an angle of approximately 45° with respect to portions of the central axis extending through the conduit fitting and the nipple.

7. A swivel coupling for nonmetallic electrical conduit as constructed in accordance with claim 1 wherein each of the sections is molded of thermoplastic.

8. An electrical installation including a swivel coupling as constructed in accordance with claim 1 further including a length of nonmetallic electrical conduit and an electrical junction box, one end of the length of conduit being secured to the conduit fitting, the junction box having an opening, the nipple extending into the opening, the stop nut being urged against an outer surface of the junction box and a tightening nut engaging a portion of the nipple extending into the junction box, the installation further including at least one wire or cable extending through the conduit, the swivel connector and into the junction box.

9. An electrical installation comprising a swivel coupling, a length of nonmetallic electrical conduit and an electrical junction box, the coupling including a first arcuate tubular section and a second arcuate tubular section, each tubular section having a connecting flange at one end, each connecting flange having a substantially planar face, the planar faces of the connecting flanges being parallel to one another and parallel to a common reference plane, a coupling nut securing the connecting flanges together, each planar face including an annular groove, the grooves being registered with one another, an "O" ring seated in the grooves, one of the connecting flanges having a threaded surface, the coupling nut including internal threads, the coupling nut further including a constricted throat, the constricted throat having a diameter less than the diameter of the other connecting flange, the tubular sections being rotatable relative to one another when the coupling nut has not been tightened and being fixed relative to one another when the coupling nut is tightened, the tubular sections having a bore with a central axis, an end of the first tubular section opposite the connecting flanges including a nipple having a threaded portion, a stop flange at an inner end of the threaded portion, a stop nut positioned on the threaded portion in abutment against the stop flange, a groove formed in the stop nut, and the stop flange being seated in the groove, the stop nut being positioned outside the junction box and the remainder of the nipple extending into the junction box, the stop flange having a diameter less than the minimum internal diameter of the coupling nut, the stop nut having a maximum transverse dimension greater than the diameter of the constricted throat, whereby the swivel coupling may be assembled by passing the coupling nut over the nipple and over the stop flange to engage the connecting flanges prior to positioning the stop nut on the threaded portion of the nipple, an end of the second tubular section opposite the connecting flanges being connected to the length of nonmetallic electrical conduit, the installation further including at least one wire or cable extending through the conduit, the swivel coupling and into the electrical junction box.

10. An electrical installation as constructed in accordance with claim 9 wherein the common reference plane intersects the central axis perpendicularly and the tubular sections are rotatable relative to one another about the central axis.

11. An electrical installation as constructed in accordance with claim 10 wherein the common reference plane lies at an angle of approximately 45° with respect to the portions of the central axis associated with the ends of the tubular sections opposite the connecting flanges.

12. An electrical installation as constructed in accordance with claim 9 further including an "O" ring positioned on the threaded portion of the nipple between the outside of the junction box and the stop nut.

13. An electrical installation as constructed in accordance with claim 9 wherein the arcuate tubular sections are molded of thermoplastic.

14. A swivel coupling for nonmetallic electrical conduit, the coupling comprising a first tubular section and a second tubular section, each tubular section having a connecting flange at one end, each connecting flange having a substantially planar face, the faces of the connecting flanges being parallel to a common reference plane, an "O" ring seal positioned between the faces and within the common reference plane, a coupling nut having a minimum internal diameter securing the connecting flanges together, the tubular sections being rotatable relative to one another when the coupling nut has not been tightened and being fixed relative to one another when the coupling nut is tightened, an end of the first section opposite the connecting flange including a nipple having a threaded portion and an end of the second section opposite the flange including a conduit fitting, the first section including a stop flange at an inner end of the threaded portion, a stop nut positioned on the threaded portion in abutment against the stop flange, a groove formed in the stop nut, and the stop flange being seated in the groove, the stop flange having a diameter less than the minimum internal diameter of the coupling nut, the stop nut having a maximum transverse dimension greater than the minimum internal diameter of the coupling nut, whereby the swivel coupling may be assembled by passing the coupling nut over the nipple and over the stop flange to engage the connecting flanges prior to positioning the stop nut on the threaded portion of the nipple.

15. A swivel coupling for nonmetallic electrical conduit in accordance with claim 14 wherein the tubular sections are arcuate.

16. A swivel coupling for nonmetallic electrical conduit in accordance with claim 14 wherein the tubular sections include a bore having a central axis and the common plane intersects the central axis perpendicularly, the tubular sections being rotatable about the central axis.

17. A swivel coupling for nonmetallic electrical conduit in accordance with claim 14 wherein the common reference plane lies at an angle of approximately 45° with respect to portions of the central axis extending through the conduit fitting and the nipple.

* * * * *